(12) United States Patent
Thiele et al.

(10) Patent No.: US 10,650,685 B2
(45) Date of Patent: May 12, 2020

(54) METHOD FOR AUTONOMOUS CONTROLLING OF A REMOTE CONTROLLED AERIAL VEHICLE AND CORRESPONDING SYSTEM

(71) Applicant: Airbus Defence and Space GmbH, Taufkirchen (DE)

(72) Inventors: Christian Thiele, Garching (DE); Winfried Lohmiller, Freising (DE); Lars Schoepfer, Manching (DE); Hugo Heusinger, Neuching (DE); Werner Kleih, Rosenheim (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 106 days.

(21) Appl. No.: 15/023,983

(22) PCT Filed: Sep. 23, 2014

(86) PCT No.: PCT/EP2014/002569
§ 371 (c)(1),
(2) Date: Mar. 22, 2016

(87) PCT Pub. No.: WO2015/043738
PCT Pub. Date: Apr. 2, 2015

(65) Prior Publication Data
US 2016/0232795 A1    Aug. 11, 2016

(30) Foreign Application Priority Data
Sep. 26, 2013 (EP) .................................. 13004679

(51) Int. Cl.
*G08G 5/00* (2006.01)
*G05D 1/00* (2006.01)
(Continued)

(52) U.S. Cl.
CPC ......... *G08G 5/0069* (2013.01); *B64C 39/024* (2013.01); *G05D 1/0022* (2013.01);
(Continued)

(58) Field of Classification Search
CPC .... G08G 5/0069; G08G 5/045; G08G 5/0056; G08G 5/0013; G05D 1/008; G05D 1/002;
(Continued)

(56) References Cited

U.S. PATENT DOCUMENTS

| | | | |
|---|---|---|---|
| 6,313,759 B1 * | 11/2001 | Musland-Sipper | G08G 5/0013 340/945 |
| 6,377,875 B1 * | 4/2002 | Schwaerzler | B64C 39/024 244/1 R |

(Continued)

FOREIGN PATENT DOCUMENTS

| | | |
|---|---|---|
| DE | 19849857 | 5/2000 |
| EP | 1462898 | 9/2004 |
| JP | 09186615 | 7/1997 |

OTHER PUBLICATIONS

European Search Report, dated Apr. 30, 2014, priority document.

*Primary Examiner* — Jeffrey C Boomer
(74) *Attorney, Agent, or Firm* — Greer, Burns & Crain, Ltd.

(57) ABSTRACT

A method for autonomous controlling of a remote controlled aerial vehicle, wherein a flight operator commands the aerial vehicle, comprising the steps of: initializing a data link between the aerial vehicle and a ground segment; determining an operation condition of the data link during use of the data link; and issuing at least one autonomous controlling command, if, as a result of the determining, a loss of the data link is determined.

9 Claims, 4 Drawing Sheets

(51) Int. Cl.
*B64C 39/02* (2006.01)
*G08G 5/04* (2006.01)

(52) U.S. Cl.
CPC ......... *G05D 1/0088* (2013.01); *G08G 5/0013* (2013.01); *G08G 5/0056* (2013.01); *G08G 5/045* (2013.01); *B64C 2201/141* (2013.01); *B64C 2201/146* (2013.01)

(58) Field of Classification Search
CPC ............ B64C 39/024; B64C 2201/146; B64C 2201/141
See application file for complete search history.

(56) References Cited

U.S. PATENT DOCUMENTS

| | | | | |
|---|---|---|---|---|
| 7,568,662 | B1* | 8/2009 | Conner | B64D 45/0015 244/118.5 |
| 2004/0193334 | A1* | 9/2004 | Carlsson | G05D 1/0022 701/9 |
| 2005/0283285 | A1* | 12/2005 | Ying | G05B 23/0208 455/423 |
| 2007/0260967 | A1* | 11/2007 | Johansson | H04L 63/12 714/819 |
| 2008/0147309 | A1* | 6/2008 | Ivansson | G05D 1/105 701/4 |
| 2010/0168949 | A1* | 7/2010 | Malecki | G05D 1/0676 701/24 |
| 2010/0292874 | A1* | 11/2010 | Duggan | G05D 1/0061 701/11 |
| 2011/0290784 | A1* | 12/2011 | Orawetz | B64D 15/12 219/486 |
| 2012/0203450 | A1 | 8/2012 | Meyer et al. | |
| 2012/0221175 | A1* | 8/2012 | Spinelli | G01S 19/01 701/2 |
| 2012/0326923 | A1* | 12/2012 | Oehler | G01S 5/0284 342/357.29 |
| 2014/0249738 | A1* | 9/2014 | Euteneuer | G01S 13/9303 701/301 |
| 2015/0025797 | A1* | 1/2015 | Hardesty | G05D 1/0684 701/469 |

* cited by examiner

METHOD FOR AUTONOMOUS CONTROLLING OF A REMOTE CONTROLLED AERIAL VEHICLE AND CORRESPONDING SYSTEM

CROSS-REFERENCES TO RELATED APPLICATIONS

This application claims the benefit of the European patent application No. 13004679.0 filed on Sep. 26, 2013, the entire disclosures of which are incorporated herein by way of reference.

BACKGROUND OF THE INVENTION

The present invention relates to a method for autonomous controlling of a remote controlled aerial vehicle and to a corresponding system.

US 2012/0203450 A1 describes an unmanned aircraft, unmanned aviation system and method for collision avoidance during the flight operation of an unmanned aircraft. The unmanned aircraft, as described there, includes a lift and propulsion system and a flight control system having a flight control unit, a navigation system and an actuator system. The flight control unit has an autopilot unit. The flight control unit, as described there, calculates control commands using data from the navigation system and/or the autopilot unit, which can be conveyed to the actuator system for actuating the lift and propulsion system. A connection between the collision warning system and the autopilot unit is provided, in order to initiate an obstacle avoidance maneuver by the autopilot unit with the help of the collision avoidance data.

In manned aviation, the flight operator, FO, or the pilot in command, PIC, receives a warning or caution based on which he decides what to do, e.g., also on experience and/or the flight manual. Appropriate reactions on failure conditions depend on the situational awareness of the flight operator and are subject to human decisions. Existing unmanned aerial systems, UAS, simply follow their flight plan based on automated predefined processes which do not consider the current state of the aerial vehicle.

There is therefore a need in the art to address the issues identified above.

SUMMARY OF THE INVENTION

There may be a need to provide improved controlling methods for aerial vehicles increasing the safety of an aerial vehicle. An object of the invention is to provide a method for autonomous controlling of a remote controlled aerial vehicle and to provide a system for conducting this method.

These objects are achieved by a method for autonomous controlling of a remote controlled aerial vehicle and a system for conducting this method according to the independent claims. In detail, a method for autonomous controlling of an aerial vehicle is provided, wherein a flight operator commands the aerial vehicle, comprising the steps of: initializing a data link between the aerial vehicle and a ground segment; determining an operation condition of the data link during use of the data link; and issuing at least one autonomous controlling command, if, as a result of the determining, a loss of the data link is determined.

Moreover, a system for conducting this method is provided comprising: a communication unit, which is designed to initialize a data link between the aerial vehicle and a ground segment; an evaluation unit, which is designed to determine an operation condition of the data link during use of the data link; and a command unit, which is designed to issue at least one autonomous controlling command if, as a result of the determining, a loss of the data link is determined.

For a single-piloted aircraft, the pilot might be not reacting anymore or might otherwise fail to have a capacity of reaction. First the pilot may not be physically available. Subsequently, the ground segment might take over control, the system according to the present invention could then provide autonomous controlling if thereafter the data-link is lost. The operation condition may include health status information. The data link may be part of a command and control, C&C, chain.

The basic idea of the invention may be seen in that a defined proceeding is provided for multiple failures, failure propagation and degradation of the air vehicle health over flight time. The aim of the method for autonomous controlling of an aerial vehicle is to provide, in any case, a predictable behavior in accordance with regulations with the appropriate level of safety.

A benefit of the invention is given by the fact that the flight operator is in command of the aerial vehicle whenever the aerial vehicle flight condition is in safe operation and the data link connections are well functioning according to an evaluation of the flight situation.

In danger threatening flight conditions, there is not only just a warning to the flight operator, but also an autonomous reaction of the autonomous controlling system, e.g., in situations in which a loss of the communication link between the aerial vehicle and the ground segment occurs, whereas the flight operator has an override capability.

A further benefit is given by the fact that means to safely cope with emergency and controlled crash scenarios are provided by the method. The situational awareness on the system status and health is provided for proper decision taking.

The autonomous behavior of the system in danger or failure situations remains predictable for the flight operator, for the air traffic management, and for third parties.

Additional failures or external events are taken into consideration to maximize the safety of the aircraft or the safety of third parties. The method is applicable for single piloted aircraft if the single pilot is physically not able to fly the aircraft anymore and allows for reducing and/or taking over parts of the pilot's workload.

According to an exemplary embodiment of the invention, the least one autonomous controlling command orders the aerial vehicle to follow a link loss route.

According to a further exemplary embodiment of the invention, the evaluation of the flight condition of the aerial vehicle is performed by means of a traffic alert and collision avoidance system of the aerial vehicle. This allows significant operational benefits in terms of airspace and aircraft control.

According to a further exemplary embodiment of the invention, the determining the operation condition of the data link during use of the data link is performed by means of a network failure detection algorithm. This advantageously provides a quick and safe check regarding the status of the data link.

According to a further exemplary embodiment of the invention, the at least one autonomous controlling command issued comprises an automatic landing of the aerial vehicle. Thereby, safe automatic landings are provided.

According to a further exemplary embodiment of the invention, the at least one autonomous controlling command issued comprises an emergency route command and/or a crash route command and/or an alternate route command and/or an approach and landing route command and/or go around procedures and/or vertical change in elevation. This allows one in an advantageously manner to autonomously adapt the flight plan.

According to a further exemplary embodiment of the invention, the least one autonomous controlling command issued comprises sending a predefined transponder code. This improves the safety level of third parties and the aerial vehicle.

According to a further exemplary embodiment of the invention, the determining the operation condition of the data link during use of the data link is performed by means of activating a data link failure command. This easily allows for the flight operator to quickly respond to apparently present malfunctions of the system, even if the system itself not yet has detected the malfunctions. This might be performed in a manned aircraft if the pilot realizes that the data link is malfunctioning and the ground segment previously has had at least a partial control of the aerial vehicle.

According to a further exemplary embodiment of the invention, the least one autonomous controlling command issued comprises modifying a predefined set point altitude of the aerial vehicle. This allows an easy adaption of the flying altitude of the aerial vehicle.

Advantageous further developments and embodiments of the present invention are subject of the dependent claims. It has to be noted that embodiments of the invention are described with reference to different subject-matters. In particular, some embodiments are described with reference to apparatus type claims, whereas other embodiments are described with reference to method type claims.

However, a person skilled in the art will gather from the above and the following description that, unless otherwise notified, in addition to any combination of features belonging to one type of subject-matter also any combination between features relating to different subject-matters is considered to be disclosed with this application.

The aspects defined above and further aspects, features and advantages of the invention may also be derived from the examples of embodiments to be described hereinafter and are explained with reference to examples of embodiments. The invention will be described in more detail hereinafter with reference to examples of embodiments but to which the invention is not limited.

BRIEF DESCRIPTION OF THE DRAWINGS

A more complete appreciation of the invention and the attendant advantages thereof will be more clearly understood by reference to the following schematic drawings, which are not to scale, wherein.

DETAILED DESCRIPTION OF THE PREFERRED EMBODIMENTS

The illustration in the drawings is schematic only. It is noted that in different figures, similar or identical elements or steps are provided with the same reference signs.

The system data of an aerial vehicle 50 may comprise system data of the data link and of the ground segment. The wording "wherein a flight operator commands the aerial vehicle 50" as used herein means that the commanding of the aerial vehicle 50 may be performed by one or two or even more flight operators in general. However, the invention may also be performed, if, for any reason, temporarily, for short, i.e., several minutes, or long times, i.e., the whole flight or several hours, none of the flight operators is available or the foreseen number of flight operators are not available.

The terms crash route 23 or crash site 15 do not necessarily mean that the aerial vehicle 50 is damaged upon landing. A crash site 15 could be any suitable ground surface, e.g., an empty parking area or an empty area of arable land.

Figure 1:
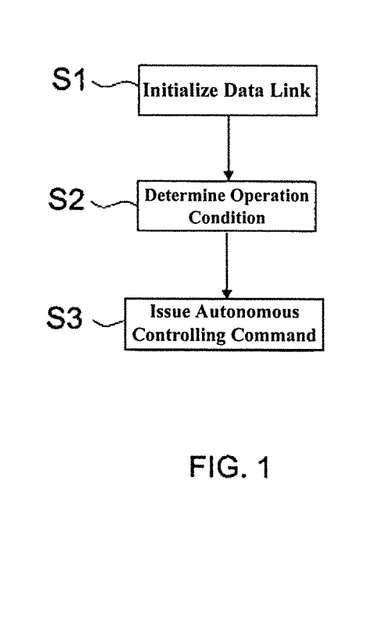
FIG. 1 shows a flow diagram of a method for autonomous controlling of a remote controlled aerial vehicle according to an exemplary embodiment of the invention.

FIG. 1 shows a flow diagram of a method for autonomous controlling of a remote controlled aerial vehicle 50 according to an exemplary of the invention. The method for autonomous controlling of the aerial vehicle 50, wherein a flight operator, FO, commands the aerial vehicle 50, comprises the following steps:

As a first step, initializing S1 a data link 30 between the aerial vehicle 50 and a ground segment 40 is performed. As a second step, determining S2 an operation condition of the data link 30 during use of the data link 30 is conducted. As a third step, issuing S3 at least one autonomous controlling command, if, as a result of the determining, a loss of the data link 30 is determined, is performed.

It is to be understood that the sequence of the steps outlined above is merely exemplary. The invention applies to unmanned aerial vehicles 50, UAVs, but also can be applied to single piloted manned aircraft if the single pilot is no longer physically able to fly the aircraft and autonomous safe flight is needed or simply to reduce the work load for the single pilot and if the manned aircraft are at least partially remote controlled.

For the case of manned aircraft, everything is applicable except the controlled crash. The following general principle is applicable for typical UAVs: The flight operator is in command of the aerial vehicle 50, AV, whenever the command and control, C&C, chain between the aerial vehicle 50 and the aerial vehicle ground segment is healthy. However, autonomous reactions are implemented and performed for situations which impact safety in an immediate manner, e.g., vertical or horizontal Sense and Avoid, S&A, maneuver, whereas the flight operator has an override capability, e.g., by switching off a traffic collision avoidance system, TCAS, as setting in advance or by a dedicated override button, as an exception to the principle of human control.

Further, autonomous reactions can be implemented and performed for situations which impact safety in an immediate manner, e.g., vertical deviations due to failure conditions or special external events, whereas the flight operator has an override capability as an exception of human control. For example, an autonomous go-around, which is an aborted landing of the aerial vehicle 50 that is on final approach, whereas the flight operator has an override capability by a dedicated override button which is connected to the system 200.

The pilot-in-command or flight operator of the aerial vehicle 50 shall have final authority as to the disposition of the aircraft while in command. When a command is issued by the flight operator, the command will be checked by the aerial vehicle ground segment and aerial vehicle 50.

In automatic mode, the aerial vehicle 50 may be guided through space and time by means of a flight plan, FP. In this mode, the aerial vehicle 50 attitude, speed and flight path 101 might be fully controlled by the system 200. No input from the flight operator is needed other than to load or modify the required flight plan.

When the flight plan is uploaded into the aerial vehicle 50, a check against the data stored in an aeronautical database is performed. This check ensures that the flight plan is safe by verifying that runway coordinates are correct, that the flight plan altitudes are higher than the minimum safe altitudes, MSA, that the approach path of the flight plan is correct; compared to the corresponding data stored in the database. Furthermore, the transmission of data through the relevant interfaces is protected by means of a network failure detection algorithm. There are at least four triggering conditions to declare link loss including the following network failure detection algorithm: BER (Bit Error Rate), PER/FER (Packet Error Rate/Frame Error Rate), BIT (Build In Test), Time-Out algorithm Parts of these checks could also be implemented on the ground in the aerial vehicle ground segment 40.

In semi-automatic mode under nominal, i.e., failure-free, conditions, the aerial vehicle 50 is guided by the commands of the flight operator. With this type of control, the flight operator commands outer loop parameters such as altitude, heading and air speed of the aerial vehicle 50 and determines the flight path 101 of the aerial vehicle 50. The aerial vehicle management system, AVMS, may be installed in the aerial vehicle 50 and operates the aerial vehicle controls to achieve the commanded outer loop parameter values.

The flight plan may contain all phases of the flight from initial taxiway, e.g., a path in an airport connecting runways and airfields with ramps, hangars, terminals and other facilities, to a final stop of the flight. A valid flight plan might be available in the control system 200 of the aerial vehicle 50 at any time after initial loading.

The flight operator has the responsibility to assure that the aerial vehicle 50 is following the flight plan in automatic mode. If unintended deviations are detected by the flight operator, he performs corrective actions in a semiautomatic mode.

Figure 2:
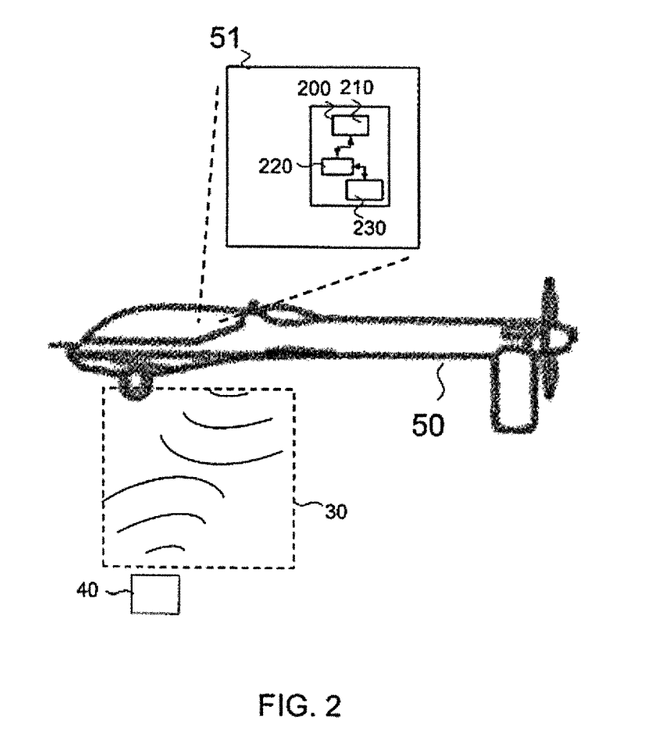
FIG. 2 shows a system for autonomous controlling of a remote controlled aerial vehicle according to a further exemplary embodiment of the invention.

FIG. 2 shows a system 200 for autonomous controlling of an aerial vehicle according to a further exemplary embodiment of the invention. The system 200 may comprise a communication unit 210, an evaluation unit 220, and a command unit 230.

The communication unit 210 might be designed to initialize a data link 30 between the aerial vehicle 50 and a ground segment 40. The communication unit 210 might further be designed to manage and perform the data communication between the aerial vehicle 50 and a ground segment 40 using the data link 30.

The evaluation unit 220 might be designed to determine an operation condition of the data link 30 during use of the data link 30. This determination might be performed by means of a network failure detection algorithm of the transmitted data. The evaluation unit 220 and/or the command unit 230 might be a programmable logic controller.

For example, the command unit 230 is designed to issue at least one autonomous controlling command if, as a result of the determining, a loss of the data link 30 is determined.

The system 200 might further comprise a flight data sensing unit which might be designed to measure flight data of the aerial vehicle. The flight data sensing unit might be a camera system, an airspeed sensor, a ground speed sensor, a space-based satellite navigation system that provides location and time information, or an aircraft collision avoidance system.

The flight data sensing unit 200 might be further include angular rate sensors for all three axes, accelerometers along all three axes, a three-axis magnetic compass, radar sensors, infrared sensors and absolute and differential pressure sensors.

The evaluation unit 220 might be further designed to evaluate the flight condition of the aerial vehicle based on the measured flight data and based on at least one decision criterion.

A flight control system 51 may comprise connecting linkages, and the necessary operating mechanisms to control an aircraft's direction in flight. The flight control system 51 might comprise the system for autonomous controlling of the aerial vehicle 50.

The aerial vehicle 50 may further be controlled by an air vehicle ground segment 40, wherein the air vehicle ground segment 40 and the aerial vehicle 50 are linked by means of a command & control chain data link 30. The air vehicle ground segment 40 may comprise a mission control element, MCE, and a Launch and recovery element, LRE.

Figure 3:
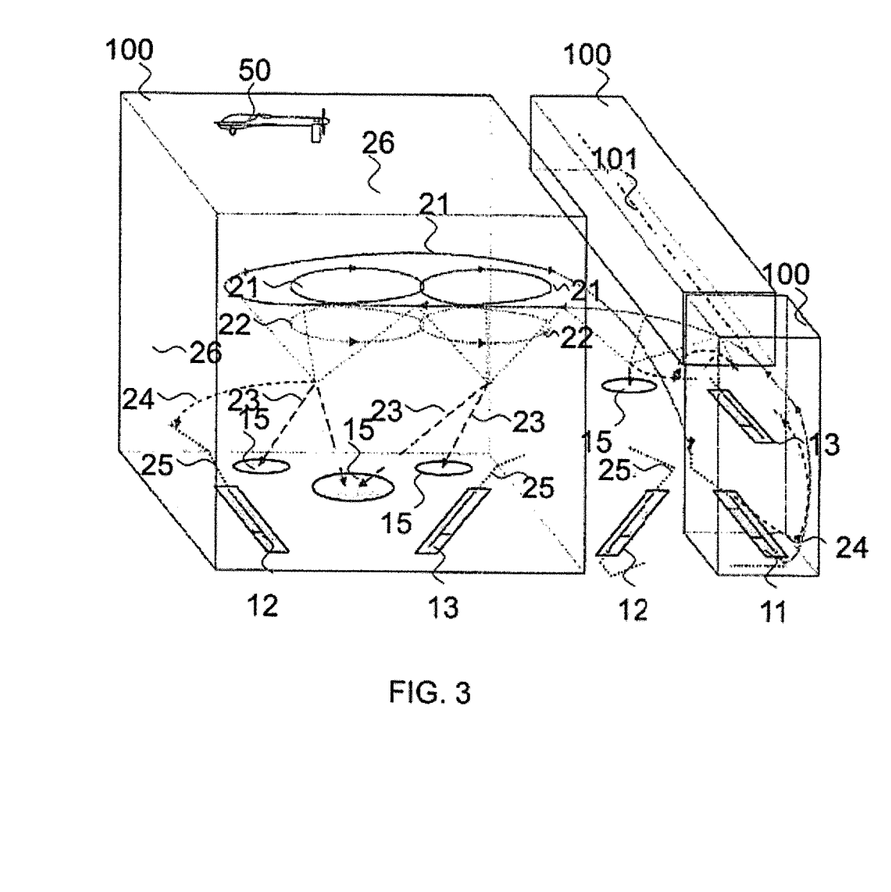
FIG. 3 shows an airspace through which the aerial vehicle is flying for explaining the invention.

FIG. 3 shows an airspace 100 through which the aerial vehicle 50 is flying for explaining the invention. FIG. 3 illustrates an aerial vehicle 50, particularly a UAS, which is flown through a mission computer which is loaded with a mission plan before each flight.

The flight plan contains at least one nominal route 21, which corresponds to a route prepared regarding the air tasking orders, ATO, and/or airspace coordination orders, ACO, from the initial taxi start to final end including taxi and alternate taxi routes. Nominal routes 21 might be part of the flight plan, FP, in the air segment and ground segment. As an active route, any type of route might be selected and might be used as the route currently followed by the aerial vehicle 50.

The flight plan for the aerial vehicle 50 includes the following further types of routes, also routes to landing sites, to be used if the nominal flight plan containing the at least one nominal route 21 is no longer feasible: alternate routes 22, approach and landing sub-routes 25, command & control, C&C, loss routes 26, emergency routes 24, or crash routes 23. A C&C loss may refer to a loss of a communication link between the aerial vehicle 50 and the ground segment 40, as shown in FIG. 2. In emergency cases, the complete part of the ground navigation equipment might not be available.

Alternative routes 22 are routes requested by flight operator and are prepared regarding the changed air tasking orders, ATO, e.g., changed mission objectives, or regarding changed airspace coordination orders, ACO. Alternate routes 22 might be only part of the mission planning in the ground segment.

Approach and landing sub-routes 25 are sub-routes normally followed from initial approach fix, IAF, to stop point for each runway of the nominal airfields 11 and alternate airfields 12. The approach and landing sub-routes 25 may include corresponding go around procedures. The approach and landing sub-routes 25 might be followed after a nominal route 21, an alternate route 22 or emergency route 24.

A command & control or link loss route 26 may be defined as a route used by the aerial vehicle 50 autonomously or if selected by the flight operator in case of a complete loss of the green system command & control chain. The link loss route 26 might end at the nominal airfield 11 or at the alternate airfield 12.

An emergency route 24 might be defined as a route used autonomously or if selected by the flight operator that permits the aerial vehicle 50 to land as soon as possible in case of problems with the air segment.

A crash sub-route 23 might be defined as a sub-route that permits the aerial vehicle 50 to go to the next reachable crash site 15. This is only applicable to UAVs to perform a controlled crash.

The flight plan may include the following types of landing sites connected to the routes above: a nominal airfield 11 and/or an alternate airfield 12. A nominal airfield 11 might be defined as an airfield from where the air segment, AS, is under nominal conditions operated regarding automatic take-off and landing, ATOL, phases for departure and/or arrival. The nominal airfield 11 can be located on the national territory or a deployment platform.

An alternate airfield 12 may be defined as an airfield used on flight operator request if cleared by the air traffic control, and/or when it is impossible to land on the nominal airfield 11, whereby the air segment is healthy. A ground landing system might be available at the alternate airfield 12. The alternate airfield might further be an aerodrome at which an aircraft would be able to land after experiencing an abnormal or emergency condition while en route.

An emergency airfield 13 might be defined as an airfield used if the air segment has a malfunction and the aerial vehicle 50 is required to land as soon as possible without being able to reach the nominal airfield 11 and/or the alternate airfield 12. The emergency airfield 13 might not be equipped with a ground landing system and the emergency airfield 13 can be designed and constructed for other purposes.

A crash site 15 might be defined as a ground location used for a controlled crash of the air segment when no landing site is reachable for the aerial vehicle 50 in these areas, casualties on ground can be avoided. A crash of the aerial vehicle 50 inside the crash sites is performed if failures occur that prevent the flight control system from maintaining the aerial vehicle 50 in a controllable and maneuverable condition until the next landing site is reached.

A flight plan of the aerial vehicle 50 shall comprise information regarding such of the following items as are considered relevant by the appropriate air traffic control authority: Aircraft identification of the aerial vehicle 50, flight rules and type of flight, number and types of aircraft and wake turbulence category, equipment, departure aerodrome, estimated off-block time, cruising speeds, cruising levels, route to be followed by the aerial vehicle 50, destination aerodrome and total estimated elapsed mission time, alternate aerodromes, fuel endurance, total number of persons on board of the aerial vehicle 50, emergency and survival equipment and further information.

After a C&C loss, the aerial vehicle 50 can select which of the flight paths 101 pre-planned in the flight plan is selected and flown. Deviations from the flight plan due to failure conditions or special external events might be restricted to only vertical, e.g., altitude level, and not horizontal due to predictability. They are autonomously recovered by the aerial vehicle 50. Deviations of the aerial vehicle 50 due to S&A maneuvers for collision avoidance might be also horizontal or lateral.

The flight operator can modify the planned flight by means of uploading a modified flight plan or by issuing a direct command A special transponder code for this failure is recommended. Modifying the flight plan is agreed at a global level by International Civil Aviation Organization.

Principally there are two ways to activate a C&C loss or emergency/crash route: first option, an autonomous activation by the aerial vehicle 50 is performed, based on position and air segment, AS, status criteria defined in the flight plan. A second option is given by a manual activation by the flight operator by dedicated commands by a dedicated direct command "new active route" to activate the nominal route 21 or alternate route 22 or C&C loss route 26 or emergency route 24 or crash route 23.

Nevertheless, the pilot-in-command, PIC, can manually fly the aircraft at any time, whether in response to air traffic control, ATC, instructions or to accommodate ad-hoc tasking or for any reason. Whichever mode is being flown, however, the aerial vehicle 50 remains predicable for third parties.

The introduction of the crash function, which is fully automatic and only uses a minimum set of systems and functions that are needed to perform a controlled crash (sensor to actuation chain plus electrical and hydraulic (emergency) power supply, is only used for unmanned vehicles. All flight trajectories (semi-automatic or automatic) will be defined by the flight operator in such a way that a cleared area crash, e.g., the crash sites 15, or landing site is reachable unless a deviation is essential for mission execution.

All flight trajectories (semi-automatic or automatic) will be defined by the flight operator in such a way that an unpopulated or cleared area crash site, where fatalities can be reasonably expected not to occur, can always be reached from the termination space with the following characteristics: a minimal gliding cone altitude to the unpopulated or cleared area crash sites, where the wind shift is only considered for large wind, a cylindrical distance limitation to the crash site, and the terrain surface will be considered by the flight operator.

Deviations from this procedure are only allowed when it is operational essential. For low altitude flight trajectories (including take off and landing) no crash sites need to be defined. Instead the flight operator will ensure that the duration of low level flights is kept as short as possible for the intended mission.

The controlled crash function is activated autonomously (under C&C loss) if landing sites cannot be reached safely anymore, e.g., due to: double engine failure, backup battery is the last remaining electrical power source, critical double fuel failure, such that landing site is no longer in range, primary and secondary environmental control system, ECS, is lost or further issues.

While the invention has been illustrated and described in detail in the drawings and foregoing description, such illustration and description are to be considered illustrative or exemplary and not restrictive; the invention is not limited to the disclosed embodiment.

Figure 4:
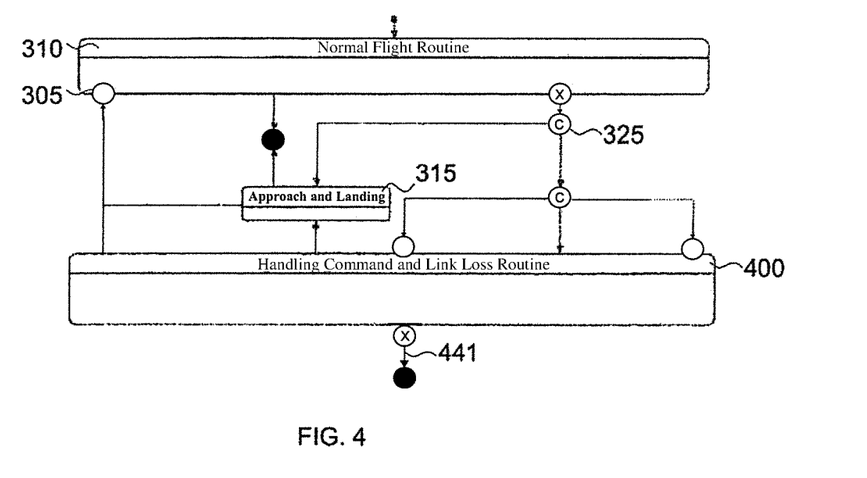
FIG. 4 shows a flowchart diagram of the C&C chain loss air segment moding for explaining the invention.

FIG. 4 shows a flowchart diagram of the C&C chain loss air segment moding for explaining the invention.

A normal flight routine 310 is setup for normal flight operations of the aerial vehicle 50. A link loss routine 325 is started if the data link 30 between the aerial vehicle 50 and the ground segment 40 is lost. Then an autonomous approach and landing routine 315 for the aerial vehicle 50 may be started. Alternatively a handling command and control link loss routine 400 is started. The handling command and control link loss routine 400 might comprise a flight operator inquiry sub-routine, by which the selecting of an emergency route or the selecting of a certain crash site is performed.

The handling command and control link loss routine 400 might be terminated by an air segment crashed routine 441, if the air segment was crashed on a crash site 15. If the data link 30 is recovered, the autonomous approach and landing routine 315 and/or the handling command and control link loss routine 340 could be terminated by a link recovered routine 305.

If the command and control chain of the aerial vehicle 50, e.g., command and control chain data link 30, between the air vehicle ground segment 40 and the aerial vehicle 50 is lost, the aerial vehicle 50 either follows a defined C&C loss route 26, an eventually existing operator command to perform an emergency landing is issued or eventually an existing operator command to perform an emergency crash is issued, or aerial vehicle 50 decides autonomously under occurring failure conditions to follow an alternate route.

If a command and control chain loss is detected, e.g., a predefined confirmation time for determining the loss is expired; a transponder code 7600 could be activated by the aerial vehicle 50.

If the aerial vehicle 50 is below the minimum instrument flight rules cruising altitude then the aerial vehicle 50 might climb to the setpoint and maintains the minimum instrument flight rules cruising altitude, otherwise the aerial vehicle maintains the current altitude and air speed target.

The aerial vehicle 50 continues for certain minutes, set by flight operator, from now or from the next compulsory reporting point, the flight operator defines if and which compulsory reporting point is used. Afterwards the aerial vehicle 50 changes altitude and air speed according to link loss route being equal to nominal route in none segregated airspace. The lower limit for Altitude is the minimum IFR cruising altitude. The aerial vehicle 50 flies horizontally to the C&C Loss Route, follows the flight plan, performs a Hold over IAF until specific time is reached, defined by FO as expected arrival time, and, subsequently, the aerial vehicle 50 performs an approach and landing routine.

If, in addition to the C&C Loss, an emergency becomes activated, the Transponder Code 7700 is set and an emergency procedure is executed. This is also applicable if the aerial vehicle 50 diverts from the active route due to failure conditions.

If a command and control chain loss of the aerial vehicle 50 is lost, the A V diverts to a defined high, medium or low altitude route of the active FP if failures, e.g., within the environmental control (ECS) or fuel heating (FUEL), or external events, e.g., icing (ICE), require that to assure continued safe flight.

There are several events and failures that require changing the altitude. This change is also done autonomously under C&C loss conditions: Violation of the lower aerial vehicle temperature limitations; Loss of a sufficient fuel heating (FUEL), or Loss of primary ECS, all may lead to a descent to a FO predefined low altitude C&C loss/emergency/crash route.

A detected icing condition (ICE) may also lead to a climb to a FO predefined high altitude C&C loss, emergency or crash route. The combination of both events leads to a medium altitude C&C loss/emergency/crash route. Therefore the FO defines for each flight: a low altitude C&C loss/emergency/crash route according to the ECS and FUEL limitations; medium altitude C&C loss/emergency/crash route according to ECS/FUEL and ICE limitations; a high altitude C&C loss/emergency/crash route according to ICE limitations only.

For example:
- 20 kft is expected to be the recommended low altitude enroute value
- 25 kft is expected to be the recommend medium altitude enroute value
- 31-45 kft is expected to be the recommend high altitude enroute value, which excludes icing for extreme weather scenarios The autonomous TCAS commands can supersede this autonomy vertically for a limited time. During a total AV C&C loss the AVGS predicts and displays the geographic position of the AV. The prediction is based on the FP, the progress before the C&C chain loss occurred, and the autonomous behavior described above.

Figure 5:
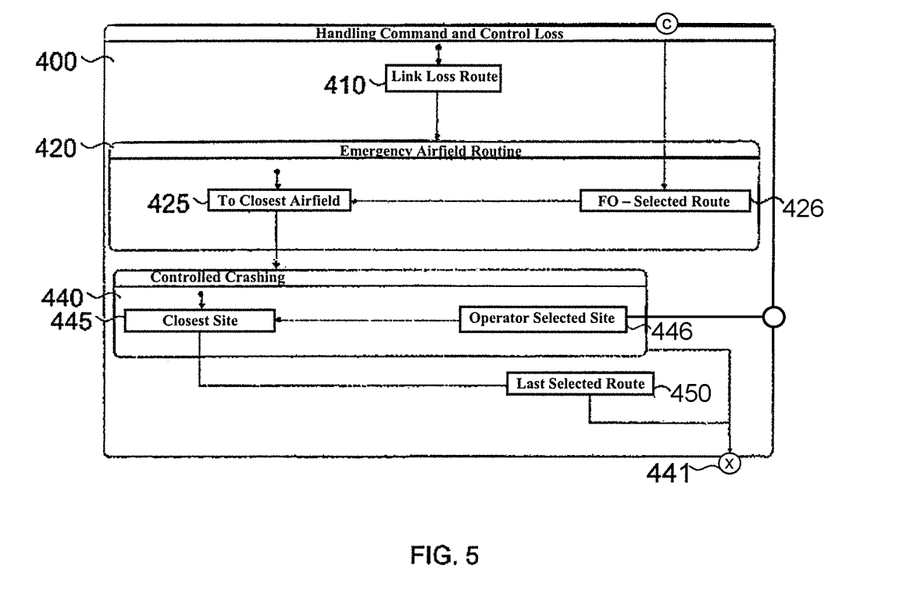
FIG. 5 shows a flowchart diagram of the autonomy under C&C chain loss moding for explaining the invention.

FIG. 5 shows a flowchart diagram of the autonomy under C&C chain loss moding for explaining the invention.

The handling command and control link loss routine 400 is started and performs a following link loss route routine 410. The following link loss route routine 410 might start off a flying to emergency airfield routine 420. The flying to emergency airfield routine 420 might comprise a flying to closest airfield subroutine 425 and a following a flight-operator-selected emergency route routine 426. The flight-operator-selected emergency route routine 426 may comprising a inquiry sub-routine, asking the flight operator in advance to the loss to select an emergency route.

The flying to emergency airfield routine 420 might start a controlled crashing routine 440. The controlled crashing routine 440 might comprise a crashing on closest site routine 445 and a crashing on operator selected site routine 446. The controlled crashing routine 440 is ended and a following last selected route routine 450 is started, which might be terminated by an air segment crashed routine 441 if the air segment was crashed on a crash site 15.

While the invention has been illustrated and described in detail in the drawings and foregoing description, such illustration and description are to be considered illustrative or exemplary and not restrictive; the invention is not limited to the disclosed embodiment.

Other variations to the disclosed embodiment can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A method for autonomous controlling of a remote controlled aerial vehicle in which a human pilot is onboard the aerial vehicle, wherein a flight operator commands the aerial vehicle from ground via a command and control chain, comprising the steps of:
   initializing a wireless data link between the aerial vehicle and an aerial vehicle ground segment located on ground, the data link being part of the command and control chain;
   using the wireless data link to perform at least one wireless data communication between the aerial vehicle and the aerial vehicle ground segment such that the flight operator remotely commands the aerial vehicle using the wireless data link;

determining an operation condition of the wireless data link during the use of the wireless data link to remotely command the aerial vehicle;

issuing at least one autonomous controlling command, if, as a result of the determining, a loss of the wireless data link is determined, wherein the at least one autonomous command issued comprises at least one of go around procedures or a vertical change in elevation; and controlling the aerial vehicle according to the issued autonomous controlling command;

wherein the step of determining the operation condition of the wireless data link during the use of the wireless data link comprises determining whether the human pilot onboard the aerial vehicle activates a data link failure command indicating loss of the wireless data link when the ground segment previously has had at least a partial control of the aerial vehicle via the wireless data link.

2. The method according to claim 1, further comprising issuing at least one additional autonomous controlling command which orders the aerial vehicle to follow a link loss route.

3. The method according to claim 1, further comprising issuing at least one additional autonomous controlling command comprising an automatic take-off of the aerial vehicle.

4. The method according to claim 1, further comprising issuing the at least one additional autonomous controlling command comprising an automatic landing of the aerial vehicle.

5. The method according to claim 1, further comprising issuing at least one additional autonomous controlling command comprising at least one of:
an emergency route command,
an alternate route command, or
an approach and landing route command.

6. The method according to claim 1, further comprising issuing at least one additional autonomous controlling command comprising sending a predefined transponder code.

7. The method according to claim 1, further comprising issuing at least one additional autonomous controlling command issued comprising modifying a predefined set point altitude of the aerial vehicle.

8. The method of claim 1, further comprising:
overriding the at least one autonomous command in response to an override command from the flight operator.

9. The system of claim 1, wherein the vertical change in elevation is based on a detected failure of an environmental control, a detected failure of fuel heating, or a detected icing condition.

\* \* \* \* \*